US011823438B2

United States Patent
Cheng et al.

(10) Patent No.: US 11,823,438 B2
(45) Date of Patent: Nov. 21, 2023

(54) RECOGNITION SYSTEM AND IMAGE AUGMENTATION AND TRAINING METHOD THEREOF

(71) Applicant: INDUSTRIAL TECHNOLOGY RESEARCH INSTITUTE, Hsinchu (TW)

(72) Inventors: Ting-Hsun Cheng, Shuishang Township (TW); Yu-Ju Chao, Zhubei (TW); Hsin-Cheng Lin, Hemei Township (TW); Chih-Chia Chang, Zhubei (TW); Yu-Hsin Lin, Toufen (TW); Sen-Yih Chou, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 239 days.

(21) Appl. No.: 17/184,319

(22) Filed: Feb. 24, 2021

(65) Prior Publication Data
US 2022/0147763 A1    May 12, 2022

(30) Foreign Application Priority Data
Nov. 9, 2020  (TW) .................................. 109138988

(51) Int. Cl.
*G06V 10/774* (2022.01)
*G06T 5/00* (2006.01)
(Continued)

(52) U.S. Cl.
CPC ............ *G06V 10/774* (2022.01); *G06T 5/002* (2013.01); *G06T 7/11* (2017.01); *G06V 20/00* (2022.01); *G06T 2207/20081* (2013.01)

(58) Field of Classification Search
CPC ...... G06K 9/6256; G06K 9/6262; G06T 7/11; G06T 5/002; G06T 2207/20081; G06N 20/00; G06V 20/00
See application file for complete search history.

(56) References Cited

U.S. PATENT DOCUMENTS

2018/0260662 A1    9/2018  Clayton et al.
2019/0156202 A1    5/2019  Falk et al.
(Continued)

FOREIGN PATENT DOCUMENTS

CN    108734719 A    11/2018
CN    108898547 A    11/2018
(Continued)

OTHER PUBLICATIONS

Izadi, Shahram, et al. "KinectFusion: real-time 3D reconstruction and interaction using a moving depth camera." Proceedings of the 24th annual ACM symposium on User interface software and technology. 2011. (Year: 2011).*
(Continued)

*Primary Examiner* — Bernard Krasnic
(74) *Attorney, Agent, or Firm* — Birch, Stewart, Kolasch & Birch, LLP

(57) ABSTRACT

A recognition system and an image augmentation and training method thereof are provided. The image augmentation and training method of a recognition system includes the following steps. A plurality of image frames are obtained, wherein each of the image frames includes an object pattern. A plurality of environmental patterns are obtained. The object pattern is separated from each of the image frames. A plurality of image parameters are set. The image frames, based on the object patterns and the environmental patterns, are augmented according to the image parameters to
(Continued)

US 11,823,438 B2

Page 2 increase the number of the image frames. A recognition model is trained using the image frames.

16 Claims, 14 Drawing Sheets

(51) Int. Cl.
*G06T 7/11* (2017.01)
*G06V 20/00* (2022.01)

(56) References Cited

U.S. PATENT DOCUMENTS

| | | | | |
|---|---|---|---|---|
| 2020/0021752 | A1* | 1/2020 | Holzer | H04N 13/282 |
| 2020/0034630 | A1* | 1/2020 | Oami | G06V 20/52 |
| 2020/0294248 | A1* | 9/2020 | Garrett | G06T 7/73 |
| 2021/0012524 | A1* | 1/2021 | Tomochika | B25J 13/08 |
| 2022/0051003 | A1* | 2/2022 | Niinuma | G06V 10/774 |

FOREIGN PATENT DOCUMENTS

| | | |
|---|---|---|
| CN | 109063845 A | 12/2018 |
| CN | 110348515 A | 10/2019 |
| CN | 110852332 A | 2/2020 |
| CN | 111860448 A | 10/2020 |
| TW | 201732690 A | 9/2017 |
| TW | 201946181 A | 12/2019 |
| TW | I695344 B | 6/2020 |

OTHER PUBLICATIONS

Henderson, Paul, and Vittorio Ferrari. "End-to-end training of object class detectors for mean average precision." Asian Conference on Computer Vision. Springer, Cham, 2016. (Year: 2016).*

Anwar, Sajid, Kyuyeon Hwang, and Wonyong Sung. "Fixed point optimization of deep convolutional neural networks for object recognition." 2015 IEEE International Conference on Acoustics, Speech and Signal Processing (ICASSP). IEEE, 2015. (Year: 2015).*

Padilla, Rafael, Sergio L. Netto, and Eduardo AB Da Silva. "A survey on performance metrics for object-detection algorithms." 2020 international conference on systems, signals and image processing (IWSSIP). IEEE, 2020. (Year: 2020).*

Hosgungor, E.—"How to Handle Imbalance Data and Small Training Sets in ML"—Oct. 27, 2020—Towards Data Science—pp. 1-8 (Year: 2020).*

Taiwanese Office Action and Search Report for Taiwanese Application No. 109138988, dated Oct. 15, 2021.

Taiwanese Office Action and Search Report dated Jun. 6, 2023 for Application No. 109138988.

* cited by examiner

US 11,823,438 B2

RECOGNITION SYSTEM AND IMAGE AUGMENTATION AND TRAINING METHOD THEREOF

This application claims the benefit of Taiwan application Serial No. 109138988 filed Nov. 9, 2020, the disclosure of which is incorporated by reference herein in its entirety.

TECHNICAL FIELD

The disclosure relates in general to a recognition system and an image augmentation and training method thereof.

BACKGROUND

Along with the development in the artificial intelligence technology, various types of objects can be recognized using a recognition system, such that the objects can be introduced to the unmanned vending field. However, when training a recognition model, if the number of object types is huge, the acquisition of sufficient image data and the action of labeling objects will require a large amount of time and labor. Under such circumstances, it is extremely difficult to use the recognition system in real-time application.

Moreover, to obtain training image data by capturing images is workable under specific background environments. In actual application, the differences in background environments will cause the recognition accuracy of the recognition system to deteriorate.

SUMMARY

The disclosure is related to a recognition system and an image augmentation and training method thereof.

According to one embodiment of the present disclosure, an image augmentation and training method of a recognition system is provided. The image augmentation and training method includes the following steps. A plurality of image frames are obtained, wherein each of the image frames includes an object pattern. A plurality of environmental patterns are obtained. The object pattern is separated from each of the image frames. A plurality of image parameters are set. The image frames, based on the object patterns and the environmental patterns, are augmented according to the image parameters to increase the number of the image frames. A recognition model is trained using the image frames.

According to another embodiment of the present disclosure, a recognition system is provided. The recognition system includes an image processing device and a model building device. The image processing device includes an image capturing device, a separation unit and a parameter setting unit. The image capturing device is configured to obtain several image frames and several environmental patterns, wherein each of the image frames includes an object pattern. The separation unit is configured to separate the object pattern from each of the image frames. The parameter setting unit is configured to set several image parameters. The model building device includes an image augmentation unit and a training unit. The image augmentation unit, based on the object patterns and the environmental patterns, is configured to augment the image frames according to the image parameters to increase the number of the image frames. The training unit is configured to train a recognition model using according to the image frames.

The above and other aspects of the invention will become better understood with regard to the following detailed description of the embodiment(s). The following description is made with reference to the accompanying drawings.

Figure 1:
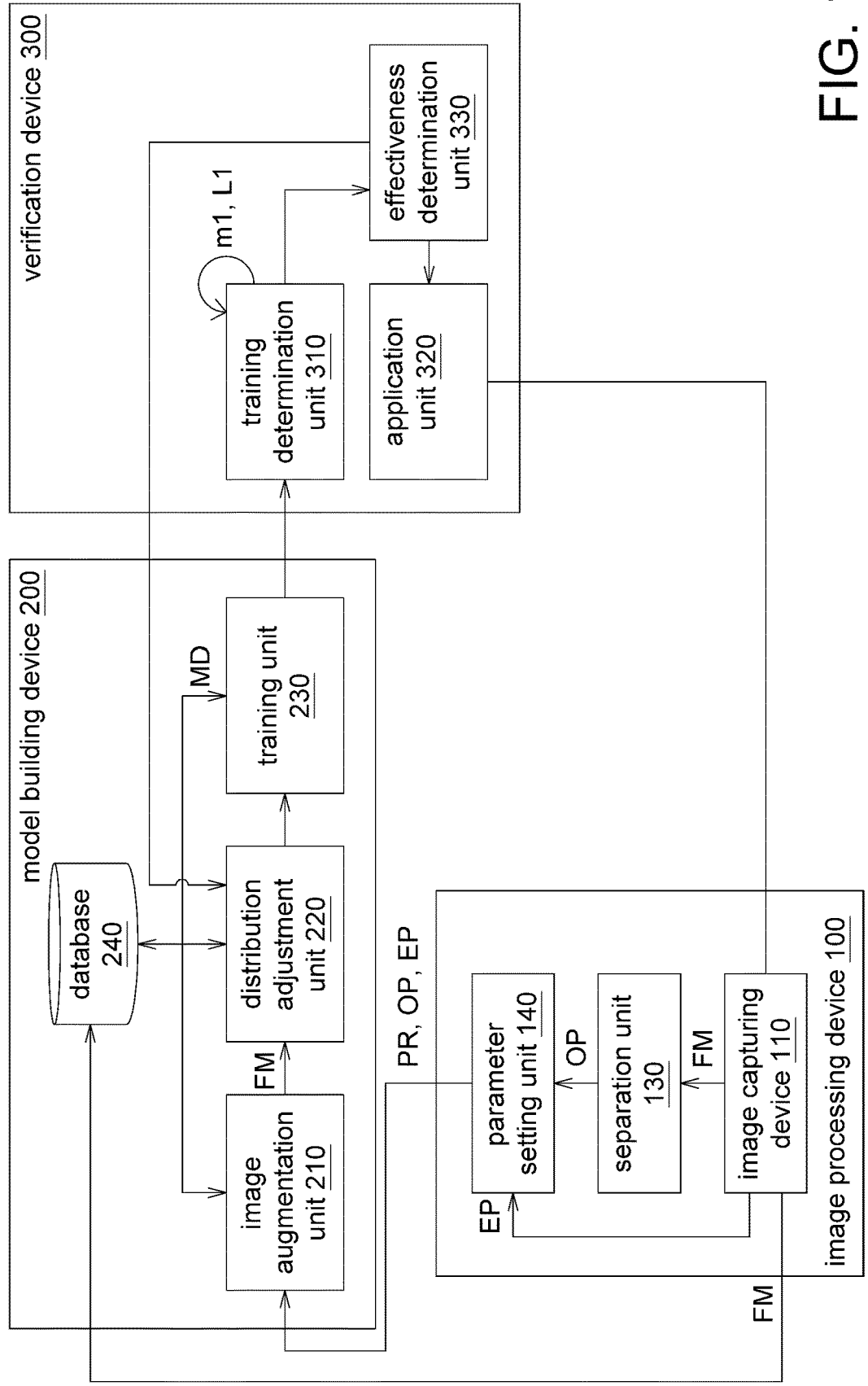
FIG. 1 is a block diagram of a recognition system according to an embodiment.

In the following detailed description, for purposes of explanation, numerous details are set forth in order to provide a thorough understanding of the disclosed embodiments. It will be apparent, however, that one or more embodiments may be practiced without these details. In other instances, well-known structures and devices are schematically shown in order to simplify the drawing.

DETAILED DESCRIPTION

The image processing device 100 includes an image capturing device 110, a separation unit 130 and a parameter setting unit 140. The model building device 200 includes an image augmentation unit 210, a distribution adjustment unit 220, a training unit 230 and a database 240. The verification device 300 includes a training determination unit 310, an application unit 320 and an effectiveness determination unit 330. The image capturing device 110 can be realized by a video camera, a data input device, a circuit, a chip, a circuit board, a computer or a storage device storing programming codes. The separation unit 130, the parameter setting unit 140, the image augmentation unit 210, the distribution adjustment unit 220, the training unit 230, the training determination unit 310, the application unit 320 and the effectiveness determination unit 330 can be realized by a circuit, a chip, a circuit board, a computer or a storage device storing programming codes. The database 240 can be realized by a memory, a hard disc, or a cloud storage center. Operations of each of the above elements are described below with accompanying flowcharts.

Figure 2:
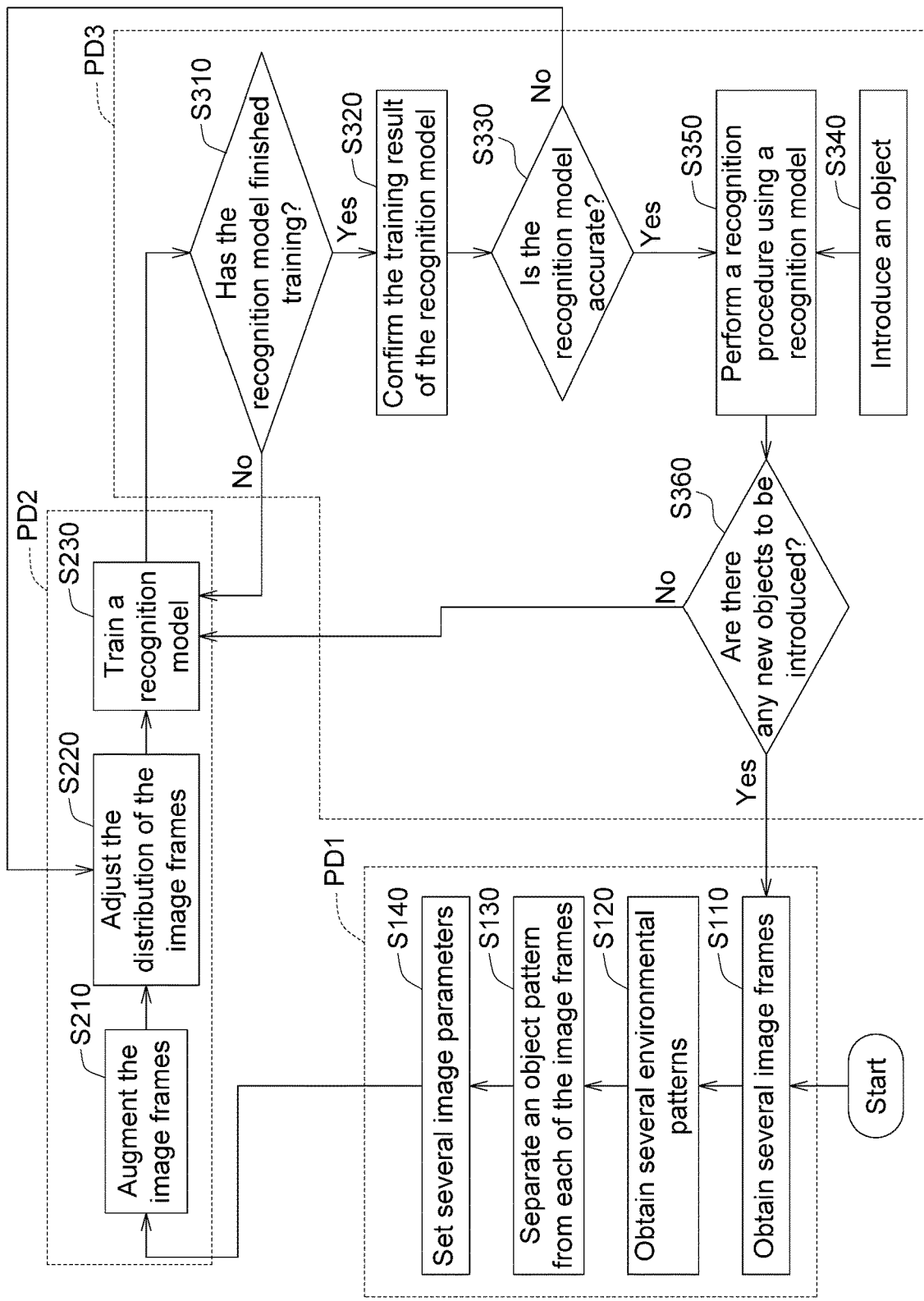
FIG. 2 is a flowchart of an image augmentation and training method of a recognition system according to an embodiment.
Figure 3:
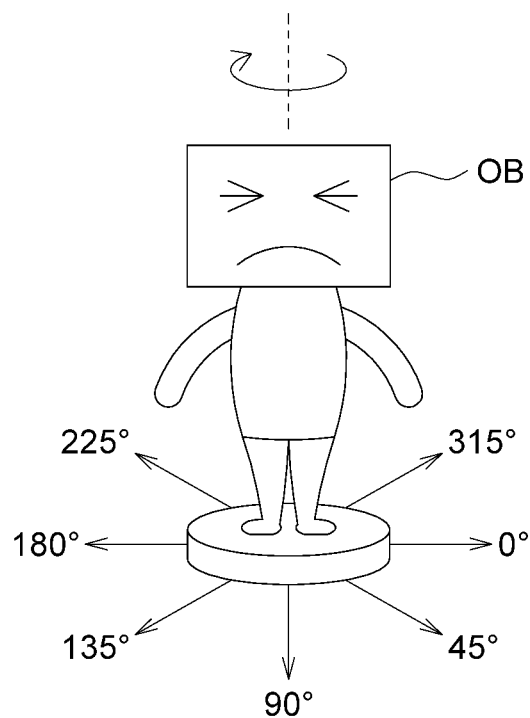
FIG. 3 is a schematic diagram of images of a physical object captured by the image capturing device at a standing posture from 8 angles.
Figure 4:
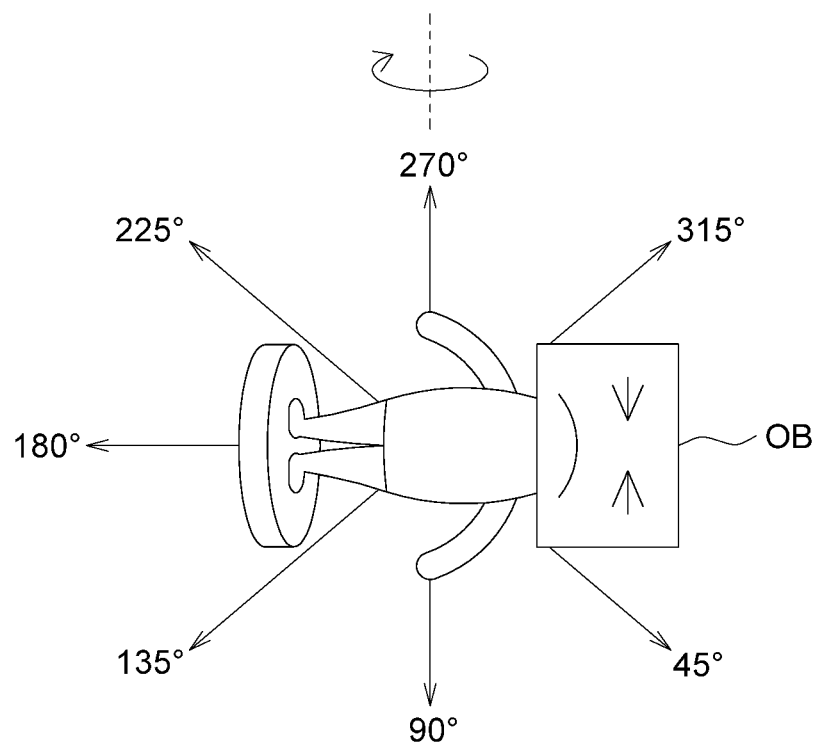
FIG. 4 is a schematic diagram of images of a physical object captured by the image capturing device at a lying posture from 8 angles.

Referring to FIG. 2, a flowchart of an image augmentation and training method of a recognition system 1000 according to an embodiment is shown. Steps S110 to S140 are an image capturing and processing procedure PD1. In step S110, several image frames FM are obtained by the image capturing device 110, wherein each of the image frames FM includes at least one object pattern OP and at least one environmental pattern EP. In the present step, the image capturing device 110 captures the image frames FM at different postures and/or different angles. Referring to FIG. 3, a schematic diagram of images of a physical object OB captured by the image capturing device at a standing posture from 8 angles is shown. Referring to FIG. 4, a schematic diagram of images of a physical object OB captured by the image capturing device 110 at a lying posture from 8 angles is shown. The capturing angle can be changed through the rotation of the physical object OB or the revolution of the physical object OB around the image capturing device 110. The image capturing device 110 captures the images of the physical object OB at different postures and/or different angles to obtain different aspects of the object pattern OP of the physical object OB. In actual practice, the to-be-recognized object in the frame can be represented at different postures and/or different angles, and the different aspects of the object pattern OP help to increase the accuracy of a recognition model MD.

Figure 5:
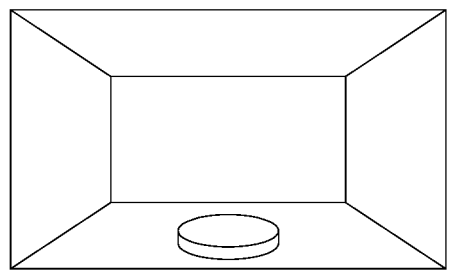
FIG. 5 is a schematic diagram of an image of an unmanned vending machine captured by the image capturing device.
Figure 6:
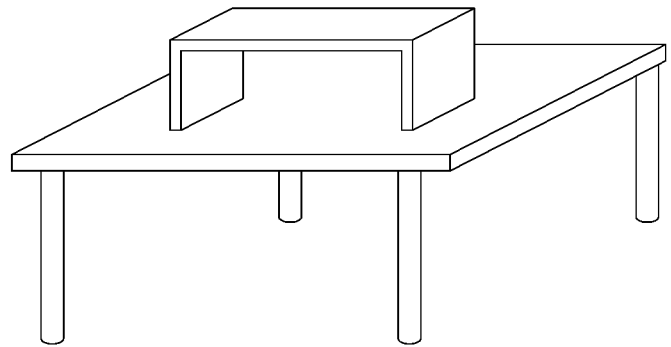
FIG. 6 is a schematic diagram of an image of a showcase captured by the image capturing device.

Next, the method proceeds to step S120, several environmental patterns EP are obtained by the image capturing device 110, Each of the environmental patterns EP may not have to include the object pattern OP. In the present step, the image capturing device 110 can capture the images of the environmental patterns EP in a physical environment or obtain the environmental patterns EP through drawing. Referring to FIG. 5, a schematic diagram of an image of an unmanned vending machine captured by the image capturing device 110 is shown. Referring to FIG. 6, a schematic of an image of a showcase captured by the image capturing device 110 is shown. Since the to-be-recognized object in the frame may appear in various environments, different environmental patterns EP help to increase the accuracy of the recognition model MD.

The step S110 and step S120 can be performed in a forward sequence or a backward sequence or can be performed concurrently.

Figure 7:
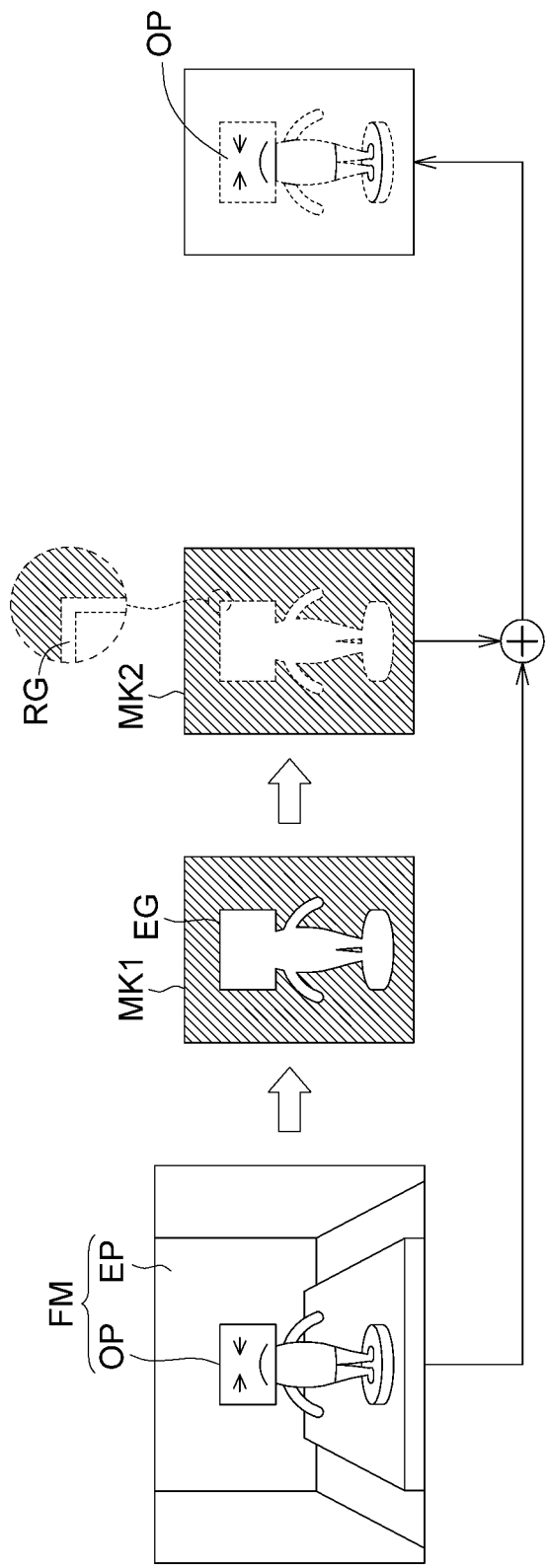
FIG. 7 is a schematic diagram of the action of separating the object pattern from an image frame.

Each of the image frames FM obtained in step S110 includes the object pattern OP. In step S130, the object pattern OP is separated from each of the image frames FM by the separation unit 130, Referring to FIG. 7, an action diagram of separating the object pattern OP from the image frame FM is shown. As indicated in the leftmost drawing, the image frame FM includes the object pattern OP and the environmental pattern EP. Through the edge detection technology, the separation unit 130 locates the edge EG of the object pattern OP and obtains a mask MK1. In the mask MK1, the reservation weight assigned to the area inside the edge EG is 100% and the reservation weight assigned to the area outside the edge EG is 0%. The separation unit 130 can further smooth the edge EG to obtain a mask MK2. The mask MK2 has an edge range RG. The edge range RG of the mask MK2 is a strap-shaped range obtained by expanding the edge EG of the mask MK1 for a certain magnification power. In the edge range RG, the reservation weight diminishes outwardly from 100% to 0%. After that, the separation unit 130 stacks the mask MK2 on the image frame FM to reserve the object pattern OP. The progressive reservation weight of the edge range RG can smooth the edge of the object pattern OP to avoid the edge of the object pattern OP being too sharp and affecting model accuracy.

Figure 8:
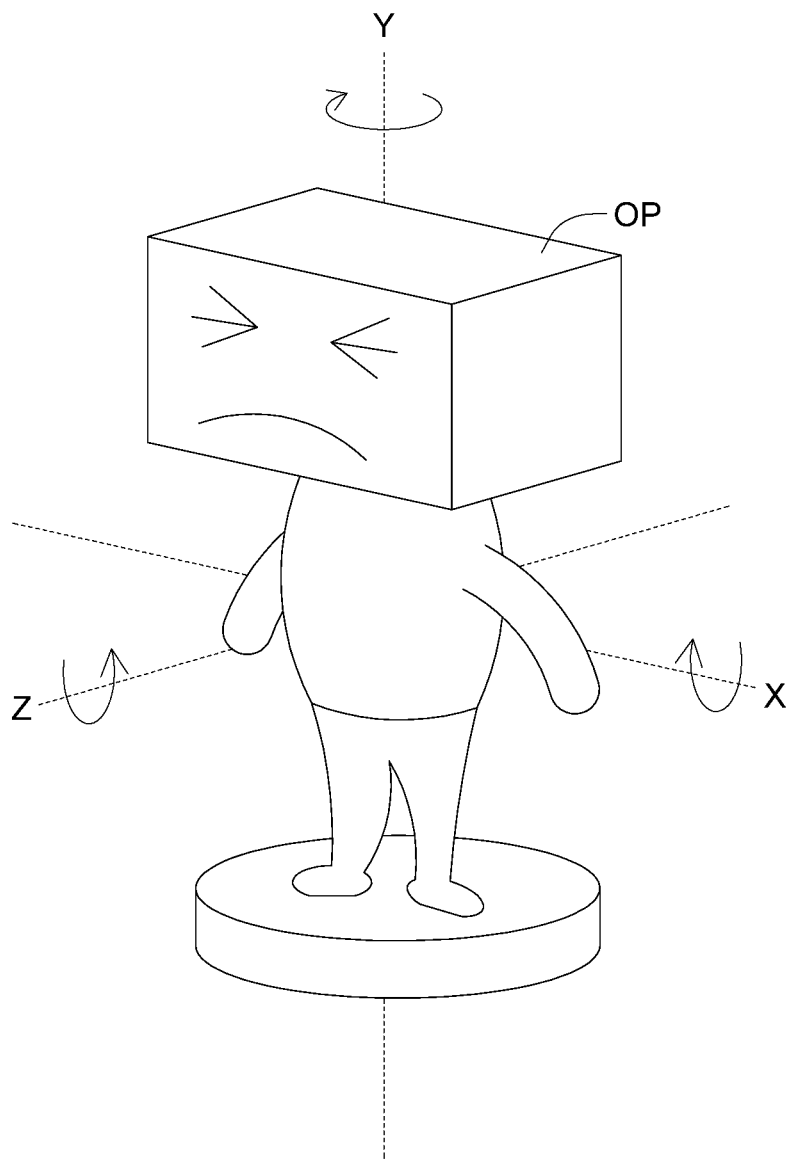
FIG. 8 is a schematic diagram illustrating various object rotation angles.
Figure 9:
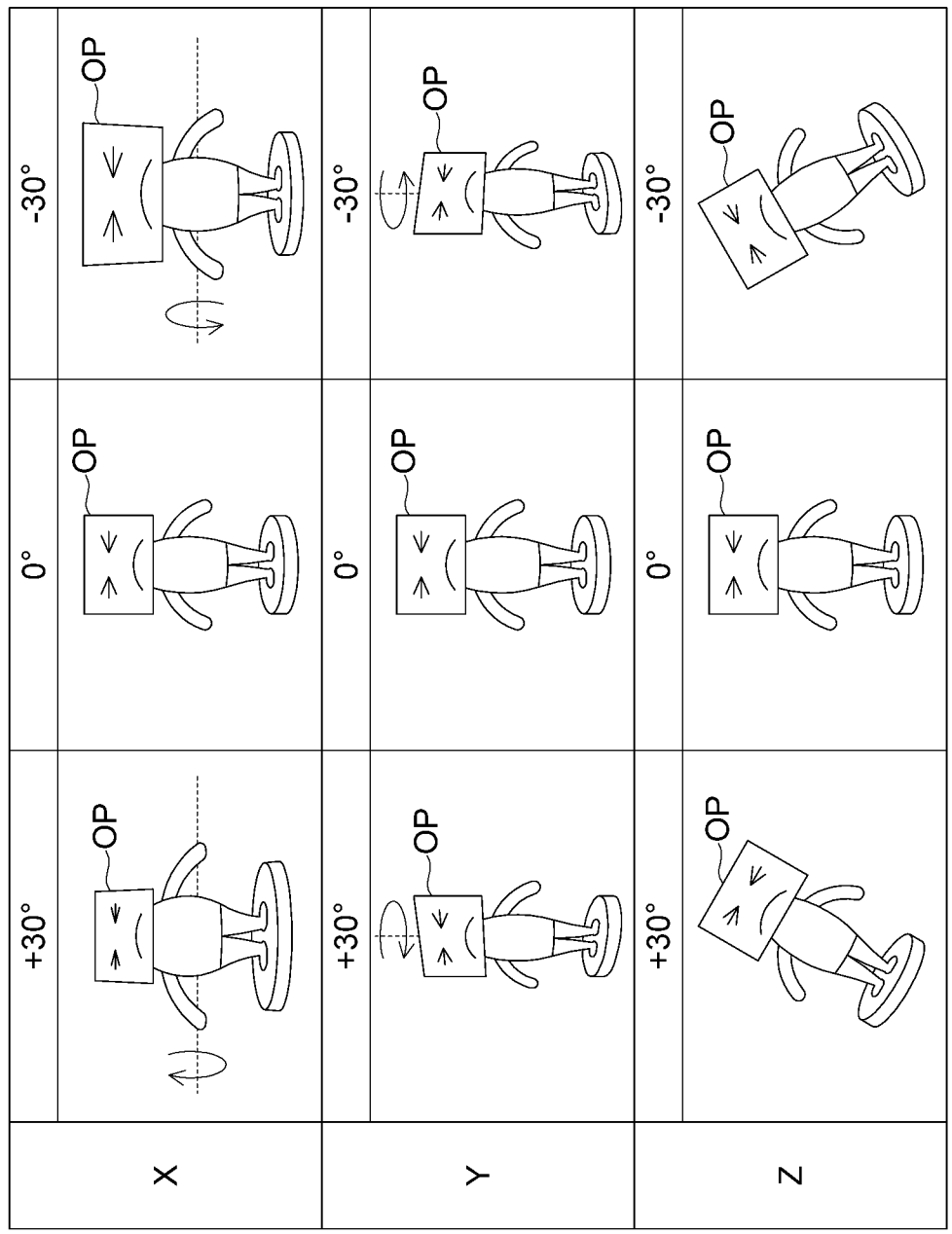
FIG. 9 is a schematic diagram illustrating the rotation of a rotated object pattern.

Then, the method proceeds to step S140, several image parameters PR are set by the parameter setting unit 140, wherein the image parameters PR are such as an object rotation angle, an object position, an object magnification, an object overlap ratio, an object size relation, an environmental background color, a source material image, an application field or a move out extent. Referring to FIG. 8, a schematic diagram illustrating various object rotation angles is shown. The object pattern OP can be rotated for a certain angle in a clockwise direction or an anti-clockwise direction along the X axis, the Y axis or the Z axis. Referring to FIG. 9, a schematic diagram illustrating the rotation of an object pattern OP is shown. In the present step, the object pattern OP is rotated. The rotation can be simulated through the deformation performed on the object pattern OP directly; or, after a 3D model is obtained and rotated, the rotated 3D model is projected as the 2D object pattern OP. Let the drawing at the top left corner of FIG. 9 be taken for example. When the object pattern OP is rotated for 30° in a clockwise direction along the X axis, the head is reduced but the feet are enlarged, such that the adjusted object pattern OP can simulate the image of the physical object OB (illustrated in FIG. 3) rotated for 30° in a clockwise direction along the X axis. Let the drawing at the bottom right corner of FIG. 10 be taken for example. When the object pattern OP is rotated for 30° in an anti-clockwise direction along the Z axis, the size does not change and the image is rotated, such that the object pattern OP can simulate the image of the physical object OB (illustrated in FIG. 3) rotated for 30° in an anti-clockwise direction along the Z axis.

Figure 10:
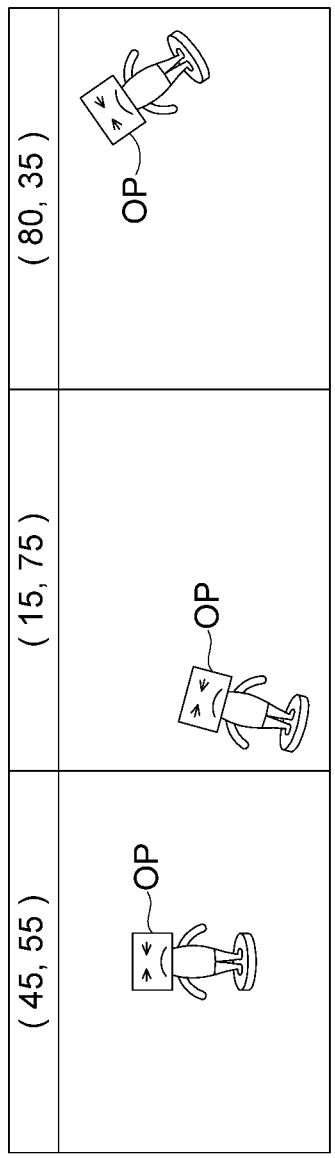
FIG. 10 is a schematic diagram illustrating various object positions.

Referring to FIG. 10, a schematic diagram illustrating various object positions is shown. For example, the object pattern OP can be moved to the coordinate point (45, 55), the coordinate point (15, 75), or the coordinate point (80, 35). In FIG. 10, the object pattern OP can also be rotated along the Z axis. Any combinations of the above image parameters PR can be used in the present embodiment.

Figure 11:
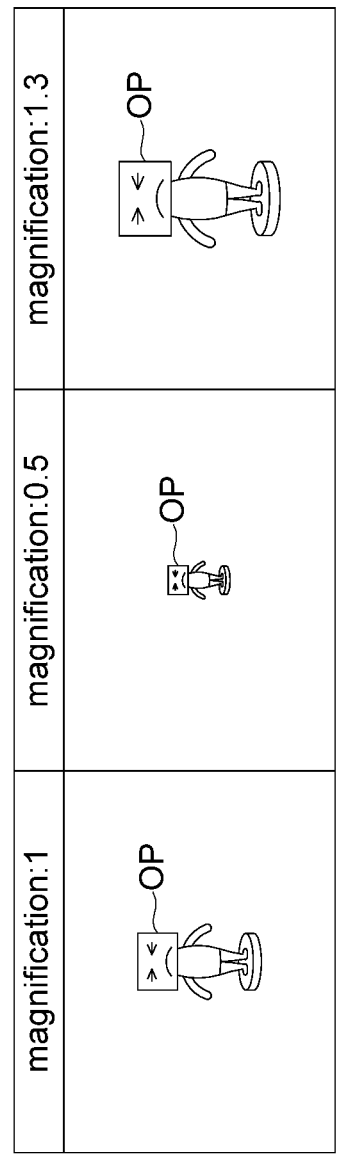
FIG. 11 is a schematic diagram illustrating various object magnification powers.

Referring to FIG. 11, a schematic diagram illustrating various object magnification powers is shown. For example, the object pattern OP can have a reduction ratio of 0.5 or an enlargement ratio of 1.3 which virtually simulates the distance of the physical object OB (illustrated in FIG. 3).

Figure 12:
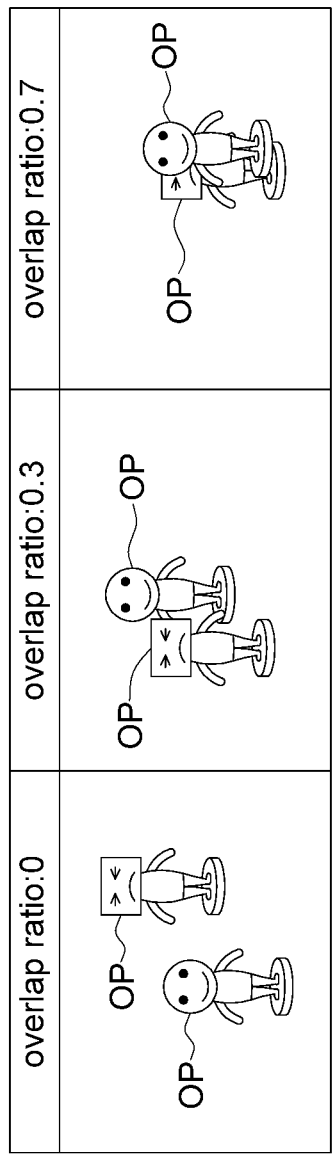
FIG. 12 is a schematic diagram illustrating various object overlap ratio.

Referring to FIG. 12, a schematic diagram illustrating various object overlap ratio is shown. For example, the object pattern OP can have an overlap ratio of such as 0, 0.3 or 0.7, and the change in the overlap ratio virtually simulates the overlapping of several physical objects OB (illustrated in FIG. 3).

Figure 13:
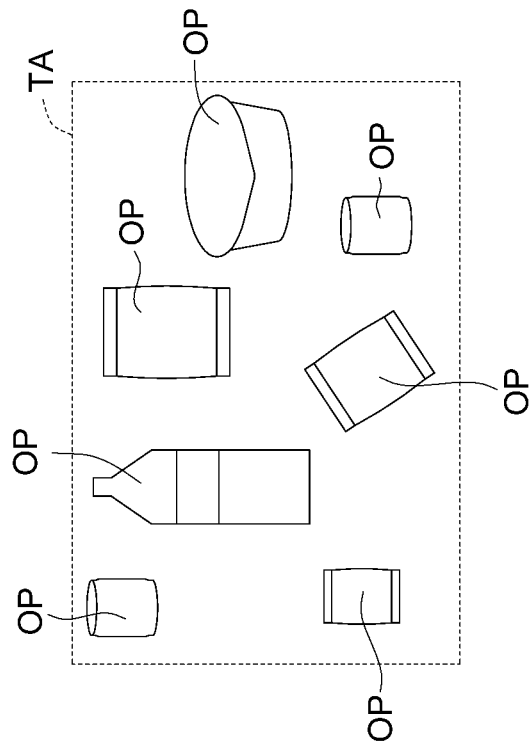
FIG. 13 is a schematic diagram illustrating various object size relations.
Figure 13:
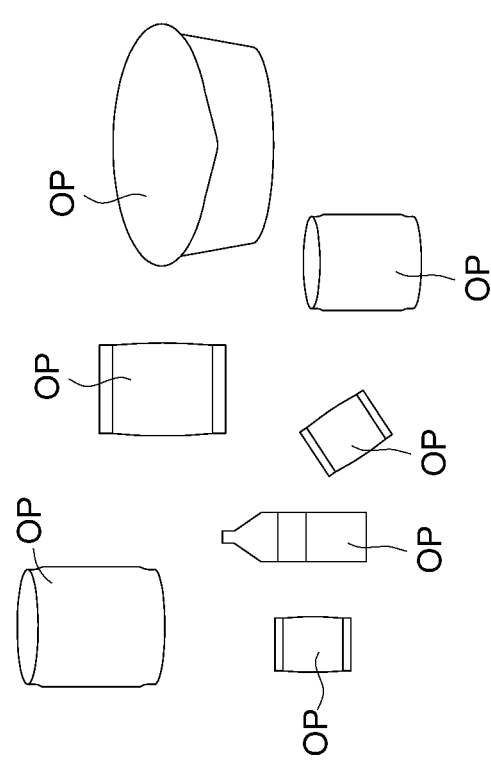

Referring to FIG. 13, a schematic diagram illustrating various object size relations is shown. When obtaining several object patterns OF, the size relation is preferably matchable. For example, under the same distance, a PET bottle should be larger than an easy-open can. Each of the object patterns OP in the positioning area TA can be adjusted to a suitable size relation according to the parameters, such as the object position, the object magnification, and the object overlap ratio, of the parameter setting unit 140.

Figure 14:
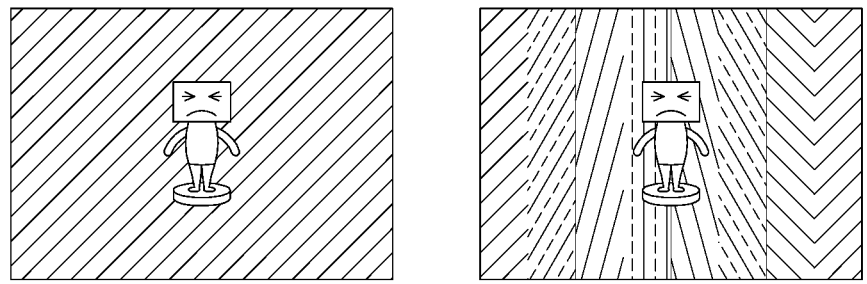
FIG. 14 is a schematic diagram illustrating various environmental background colors.

Referring to FIG. 14, a schematic diagram illustrating various environmental background colors is shown. As indicated in the left drawing, the parameter setting unit 140 can set the environmental background color to monochrome (such as yellow (R: 238, G: 245, B: 149)). As indicated in the right drawing, the parameter setting unit 140 can set the environmental colors to multi-color scale (chromatic multi-color scale or monochromatic multi-color scale).

Figure 15:
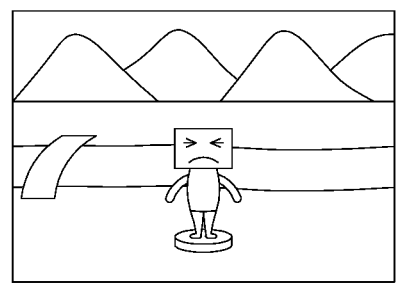
FIG. 15 is a schematic diagram illustrating a source material image.

Referring to FIG. 15, a schematic diagram illustrating a source material image is shown. The parameter setting unit 140 can use a captured image of a real scene, an image obtained by mixing three primary colors at any ratios or a drawing or an image obtained from the internet as a source image. The source material image is such as a cartoon picture, a combination of color blocks or an image of a real scene. The change in the source material image virtually simulates the physical object OB (illustrated in FIG. 3) at different environmental scenes.

Figure 16:
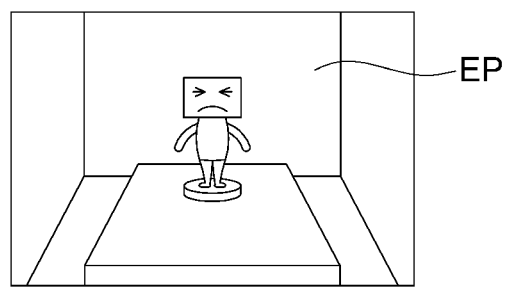
FIG. 16 is a schematic diagram illustrating an application field.

Referring to FIG. 16, a schematic diagram illustrating an application field is shown. The application field is such as a showcase or a desktop. The parameter setting unit 140 can use different environmental patterns EP as the application field. The change in the application field virtually simulates the physical object OB (illustrated in FIG. 3) at different environments.

Figure 17:
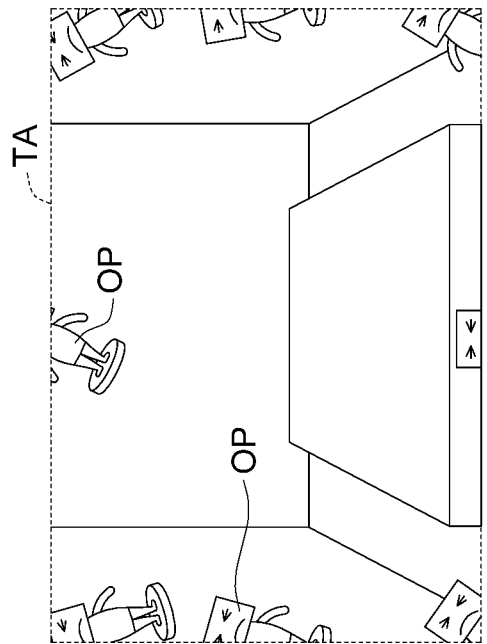
FIG. 17 is a schematic diagram illustrating an augmentation of incomplete objects.
Figure 17:
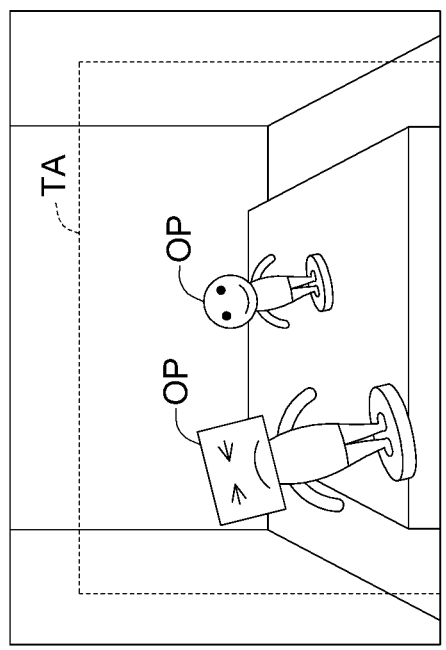

Referring to FIG. 17, a schematic diagram illustrating an augmentation of incomplete objects is shown. As indicated in the left drawing, the parameter setting unit 140 defines that all of the object patterns OP are inside the positioning area TA. As indicated in the right drawing, the parameter setting unit 140 defines that some of the object pattern OP are moved out the positioning area TA. The change in the move out extent parameter virtually simulates the situation that the physical object OB (illustrated in FIG. 3) is partially captured.

Then, the method proceeds to step S210 to S230. Steps S210 to S230 are an image augmentation and model training procedure PD2. In step S210, the image augmentation unit 210, based on the object patterns OP and the environmental patterns EP, augments the image frames FM according to the image parameters PR to increase the number of the image frames FM. The object patterns OP captured at several postures and/or several angles can be synthesized with various environmental patterns EP to form a new image frame FM. Or, the object patterns OP or the environmental patterns EP can be adjusted according to the image parameters PR to form a new image frame FM. The augmented image data can simulate various possible situations to reduce manual actions of capturing images. In the present step, since the image augmentation unit 210 already obtains the position and range of each object pattern OP during the image augmentation process, the image augmentation unit 210 can automatically label the object pattern OP on the image frames FM and there is no need to perform manual labeling.

Figure 18:
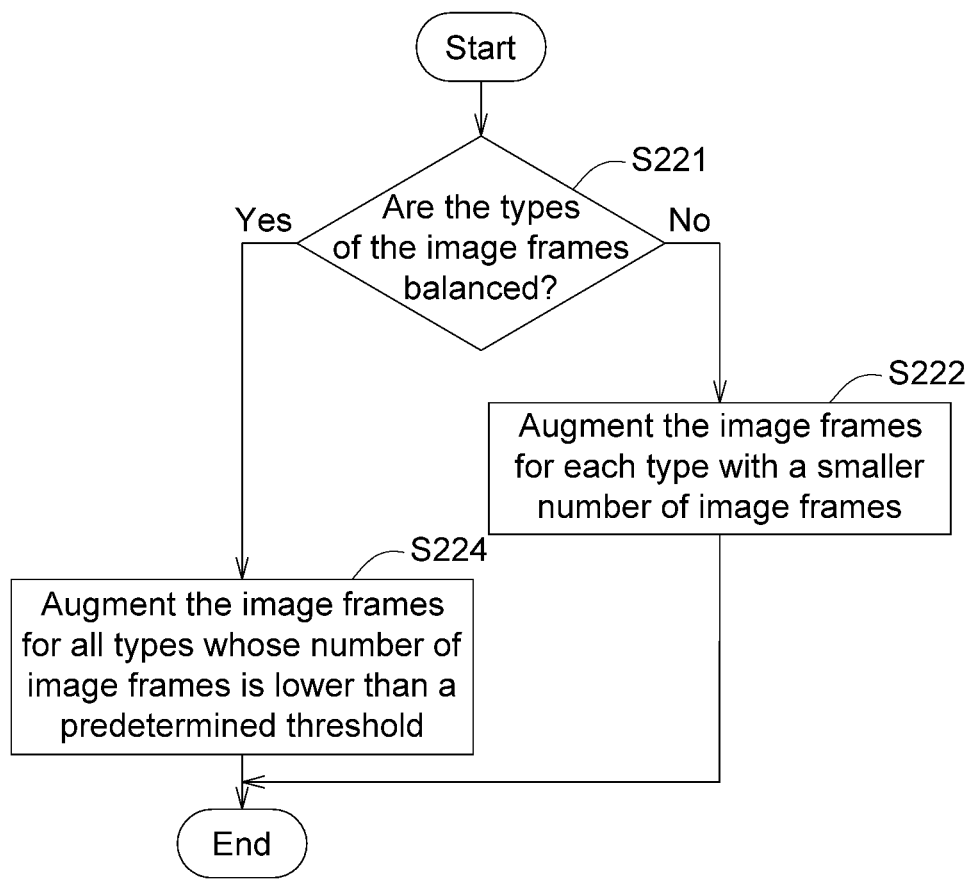
FIG. 18 is a detailed flowchart of step S220 according to an embodiment.

Then, the method proceeds to step S220, the distribution of the image frames FM is adjusted by the distribution adjustment unit 220 to achieve a uniform distribution. Referring to FIG. 18, a detailed flowchart of step S220 according to an embodiment is shown. In step S221, whether the types of the image frames FM are balanced is determined by the distribution adjustment unit 220. The types are defined according to the combinations of the object patterns OR the environmental patterns EP, and the image parameters PR. The term "balanced" refers to each of the types having a similar number of the image frames. If it is determined that the types of the image frames FM are balanced, the method proceeds to step S224; if it is determined that the types of the image frames FM are not balanced, the method proceeds to step S222.

In step S222, for each type with a smaller number of the image frames, the image frames FM are augmented by the distribution adjustment unit 220. The distribution adjustment unit 220 augments the image frames FM for one type at each time or augments the image frames FM for all types whose number of the image frames is lower than the largest number of the image frames at one time. Through the present step, the distribution adjustment unit 220 allows each type to have a similar number of the image frames. For example, 3 objects, 3 postures and 3 environments can form 9 types. Suppose the number of the image frames is 1050 for most types. If the number of the image frames is 950 for a certain type, the image frames FM of this certain type need to be augmented to 1050.

In step S224, for all types whose number of the image frames is lower than a predetermined threshold, the image frames FM are augmented by the distribution adjustment unit 220. Through the present step, the distribution adjustment unit 220 allows the number of the image frames to be higher than or equivalent to the predetermined threshold for all types.

Refer to FIG. 1 and FIG. 2 at the same time. In step S230, the recognition model MD is trained by the training unit 230 using the image frames FM. The recognition model MD can be stored in the database 240.

Figure 19:
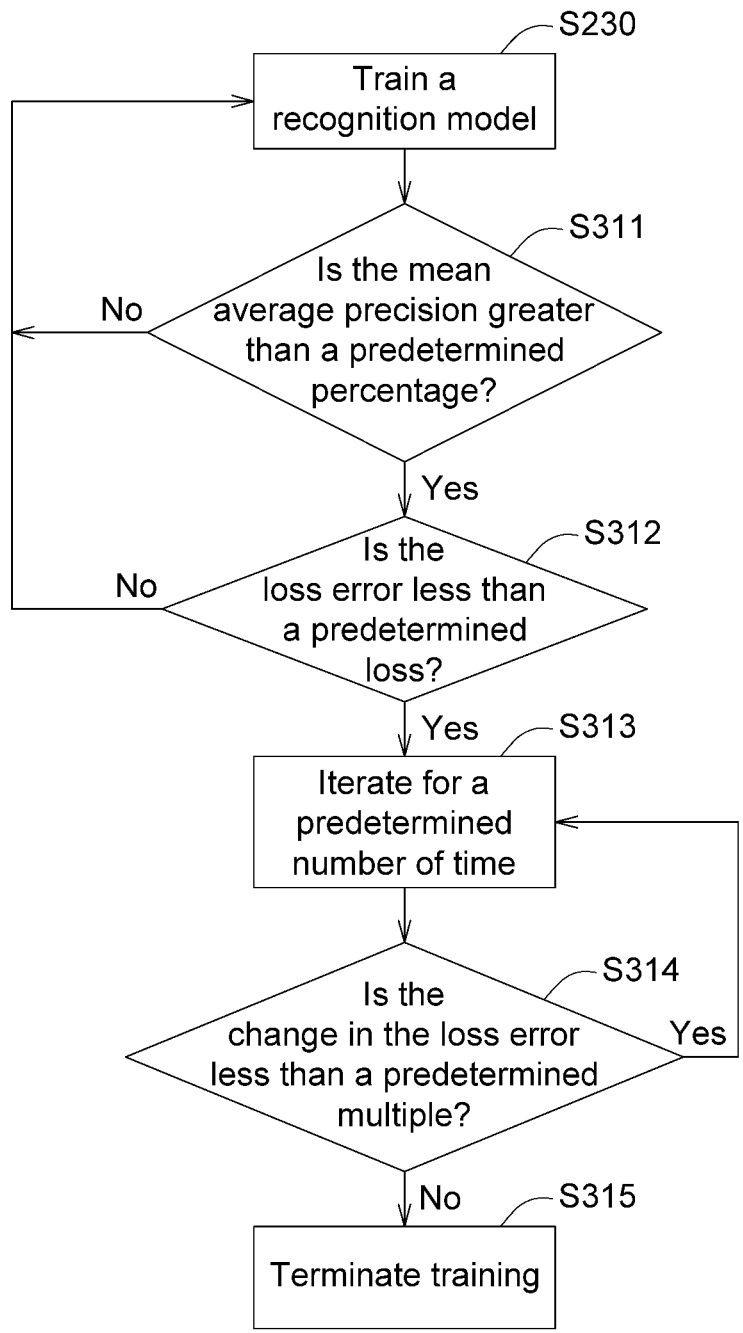
FIG. 19 is a detailed flowchart of step S310 according to an embodiment.

After that, the method proceeds to step S310 to S360. Steps S310 to S360 are a verification procedure PD3 for training result and recognition effectiveness. In step S310, whether the recognition model MD has finished training is determined by the training determination unit 310 according to a training output of the recognition model MD. The training output is such as mean average precision OAP) m1 or a loss error L1. Referring to FIG. 19, a detailed flowchart of step S310 according to an embodiment is shown. In step S311, whether the mean average precision m1 is greater than a predetermined percentage (such as 75%, 80%, 85%, or 90%) is determined by the training determination unit 310. If it is determined that the mean average precision m1 is greater than the predetermined percentage, the method proceeds to step 3312; if it is determined that mean average precision m1 is not greater than the predetermined percentage, the method continues with step S230.

In step S312, whether the loss error L1 is less than a predetermined loss (such as 0.8, 0.9, 1, 1.1, or 1.2) is determined by the training determination unit 310. If it is determined that the loss error L1 is not less than the predetermined loss, the method continues with step S230; if it is determined that the loss error L1 is less than the predetermined loss, the method can selectively proceed to step S313 or directly proceed to step 3320.

In step S313, the present step is iterated for a predetermined number of times (such as 1000 times, the predetermined number of times can be adjusted according to actual needs).

In step S314, whether the change in the loss error L1 is less than a predetermined multiple (such as 0.7, 0.8, 0.9) is determined by the training determination unit 310. If the loss error L1 continuously converges but its change is not less than the predetermined multiple, the method proceeds to step S315, the training is terminated.

Refer to FIG. 1 and FIG. 2 at the same time. In step S320, the training result of the recognition model MD is confirmed.

Then, the method proceeds to step S330, whether the recognition model MD is accurate is determined by the effectiveness determination unit 330. If it is determined that the recognition model MD is not accurate, the method returns to step S220; if it is determined that the recognition model MD is accurate, the method proceeds to step S350.

Additionally, the method can proceed to step S350 from step S340. In step S340, an object introduction procedure is performed.

In step S350, a recognition procedure is performed by the application unit 320 using the recognition model MD. For example, after the application unit 320 captures an object image, the application unit 320 can calculate the probability of the object image including a certain object or several objects as well as the position and range of the object using the recognition model MD.

Then, the method proceeds to step S360, whether there are any new objects to be introduced is determined by the effectiveness determination unit 330. If it is determined that there are new objects to be introduced, the method returns to step S110, the image frames FM corresponding to the physical object OB are captured, and subsequent steps are performed; if it is determined that there are no new objects to be introduced, the method returns to step S230, the recognition model MD is trained.

That is, once the recognition model MD is found to be inaccurate, the method returns to step S220, the distribution of the image frames FM is adjusted by the distribution adjustment unit 220. For example, the images of an object with recognition error are augmented, such that the recognition model MD can increase recognition accuracy for the object. For example, to increase the recognition accuracy of an object with recognition error, the distribution adjustment unit 220 can increase the number of images by 30% or 20% according to the degree of recognition error.

Once it is determined that there are new objects to be introduced, the method returns to step S110, the new objects are trained.

The embodiments of the present disclosure provide the recognition system 1000 and the image augmentation and training method thereof. The adaptive image augmentation technology is used to increase the number of the image frames FM, and during the image augmentation process, various settings of the object pattern OP and the environmental patterns EP are used to enrich the diversity of the image frames FM. Moreover, the image augmentation and model training procedure PD2 is performed to adjust the distribution of image frames FM, and the verification procedure PD3 for training result and recognition effectiveness is performed to increase the accuracy of the recognition model MD. With a small number of the image frames FM, the recognition model MD of the present disclosure can be trained to have high accuracy.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image augmentation and training method of a recognition system, comprising:
   obtaining a plurality of image frames, wherein each of the image frames comprises an object pattern;
   obtaining a plurality of environmental patterns;
   separating the object pattern from each of the image frames;
   setting a plurality of image parameters;
   augmenting, based on the object patterns and the environmental patterns, the image frames according to the image parameters to increase a number of the image frames;
   adjusting a distribution of the image frames to balance a plurality of types of the image frames, wherein the types comprise combinations of the object patterns, the environmental patterns, and the image parameters; and
   training a recognition model using the image frames;
   wherein the step of adjusting the distribution of the image frames comprises:
      determining whether the plurality of types of the image frames are balanced;
      if the types of the image frames are not balanced, augmenting the image frames for some of the types;
      determining whether the number of the image frames for each of the types has reached a predetermined threshold; and
      if the number of the image frames for one of the types is lower than a predetermined threshold, augmenting the image frames for the one of the types whose number of the image frames is lower than the predetermined threshold.

2. The image augmentation and training method of the recognition system according to claim 1, wherein in the step of obtaining the image frames, the image frames are captured at different postures and/or different angles.

3. The image augmentation and training method of the recognition system according to claim 1, wherein one of the environmental patterns is a virtual environment.

4. The image augmentation and training method of the recognition system according to claim 1, wherein the image parameters comprise an object rotation angle, an object position, an object magnification, an object overlap ratio, an object size relation, an environmental background color, a source material image, an application field or a move out extent.

5. The image augmentation and training method of the recognition system according to claim 1, wherein in the step of augmenting the image frames, the object patterns are automatically labeled.

6. The image augmentation and training method of the recognition system according to claim 1, further comprising:
   determining whether the recognition model has finished training according to a training output of the recognition model;
   determining whether the recognition model is accurate if the recognition model has finished training; and
   performing the step of adjusting the distribution of the image frames again if the recognition model is not accurate.

7. The image augmentation and training method of the recognition system according to claim 6, wherein the step of determining whether the recognition model has finished training comprises:
   determining whether a mean average precision (mAP) is greater than a predetermined percentage;
   deeming that the recognition model has not finished training if the mean average precision is not greater than predetermined percentage;
   determining whether a loss error is less than a predetermined loss; and deeming that the recognition model has not finished training if the loss error is not less than predetermined loss.

8. The image augmentation and training method of the recognition system according to claim 7, wherein the step of determining whether the recognition model has finished training further comprises:
determining whether a change in the loss error is less than a predetermined multiple; and
deeming that the recognition model has not finished training if the change in the loss error is not less than predetermined multiple.

9. A recognition system, comprising:
an image processing device, comprising:
an image capturing device configured to obtain a plurality of image frames and obtain a plurality of environmental patterns, wherein each of the image frames comprises an object pattern;
a separation unit configured to separate the object pattern from each of the image frames; and
a parameter setting unit configured to set a plurality of image parameters; and
a model building device, comprising:
an image augmentation unit configured to augment, based on the object patterns and the environmental patterns, the image frames according to the image parameters to increase a number of the image frames;
a distribution adjustment unit configured to adjust a distribution of the image frames to balance a plurality of types of the image frames, wherein the types comprise combinations of the object patterns, the environmental patterns, and the image parameters; and
a training unit configured to train a recognition model according to the image frames;
wherein the distribution adjustment unit is further configured to:
determine whether the plurality of types of the image frames are balanced, wherein if the plurality of types of the image frames are not balanced, the distribution adjustment unit augments the image frames for some of the types; and
determine whether the number of the image frames for each of the types has reached a predetermined threshold, wherein if the number of the image frames for one of the types is lower than a predetermined threshold, the distribution adjustment unit augments the image frames for the one of the types whose number of the image frames is lower than the predetermined threshold.

10. The recognition system according to claim 9, wherein the image capturing device captures the image frames at different postures and/or different angles.

11. The recognition system according to claim 9, wherein the separation unit further is configured to smooth edges of the object patterns.

12. The recognition system according to claim 9, wherein one of the environmental patterns is a virtual environment.

13. The recognition system according to claim 9, wherein the image parameters comprise an object rotation angle, an object position, an object magnification, an object overlap ratio, an object size relation, an environmental background color, a source material image, an application field or a move out extent.

14. The recognition system according to claim 9, wherein the image augmentation unit further automatically labels the object patterns.

15. The recognition system according to claim 9, further comprising:
a verification device, comprising:
a training determination unit configured to determine whether the recognition model has finished training to according to a training output of the recognition model;
an application unit configured to perform a recognition procedure using the recognition model; and
an effectiveness determination unit configured to determine whether the recognition model is accurate.

16. The recognition system according to claim 15, wherein the training determination unit determines whether the recognition model has finished training according to a mean average precision (mAP) and a loss error.

* * * * *